R. HUFF.
BRAKE MECHANISM FOR MOTOR CARS.
APPLICATION FILED JULY 14, 1911.
1,120,056.
Patented Dec. 8, 1914.
3 SHEETS—SHEET 1.
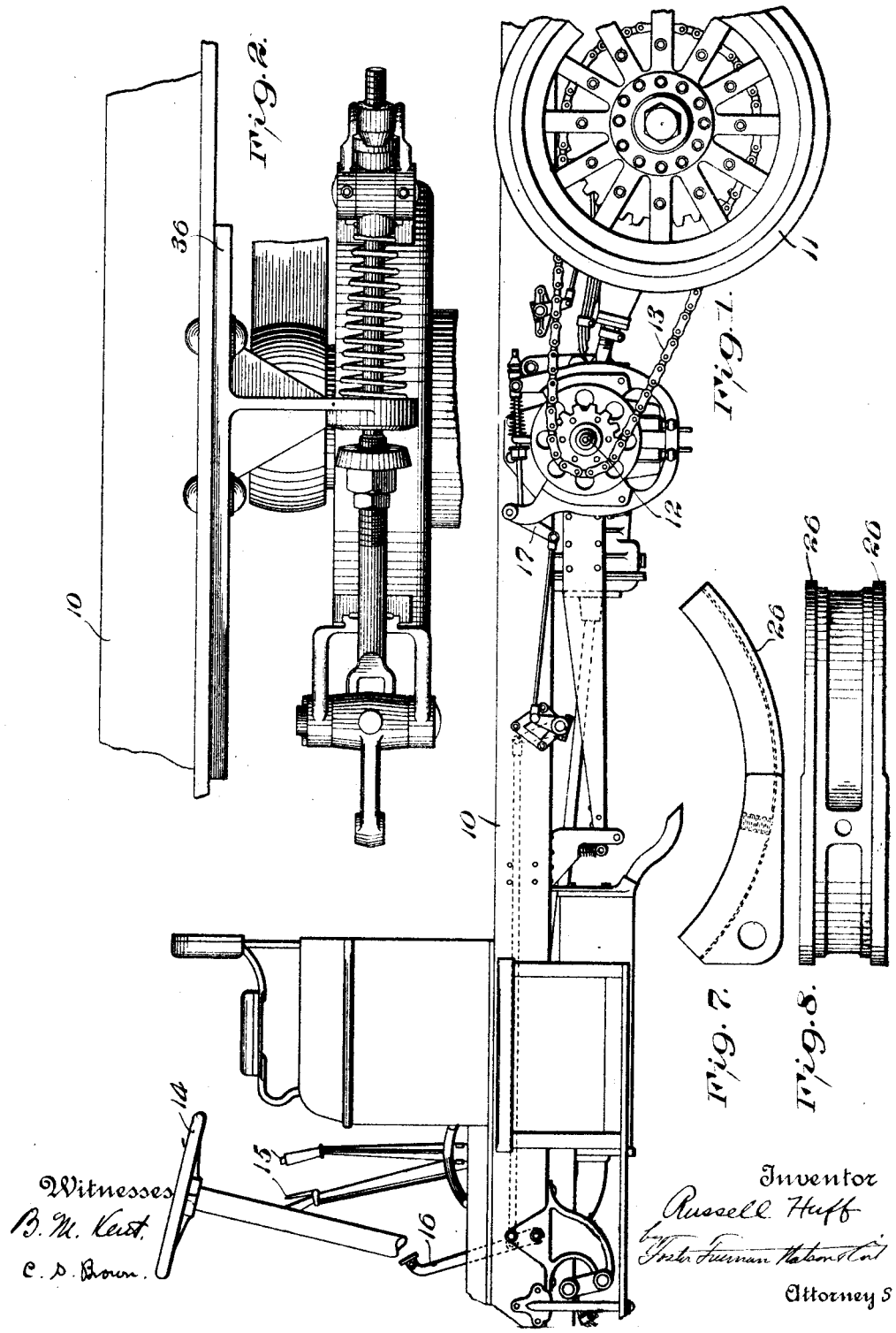
Witnesses
B. M. Keist.
C. D. Brown.
Inventor
Russell Huff
by Foster Freeman Watson & Coit
Attorneys

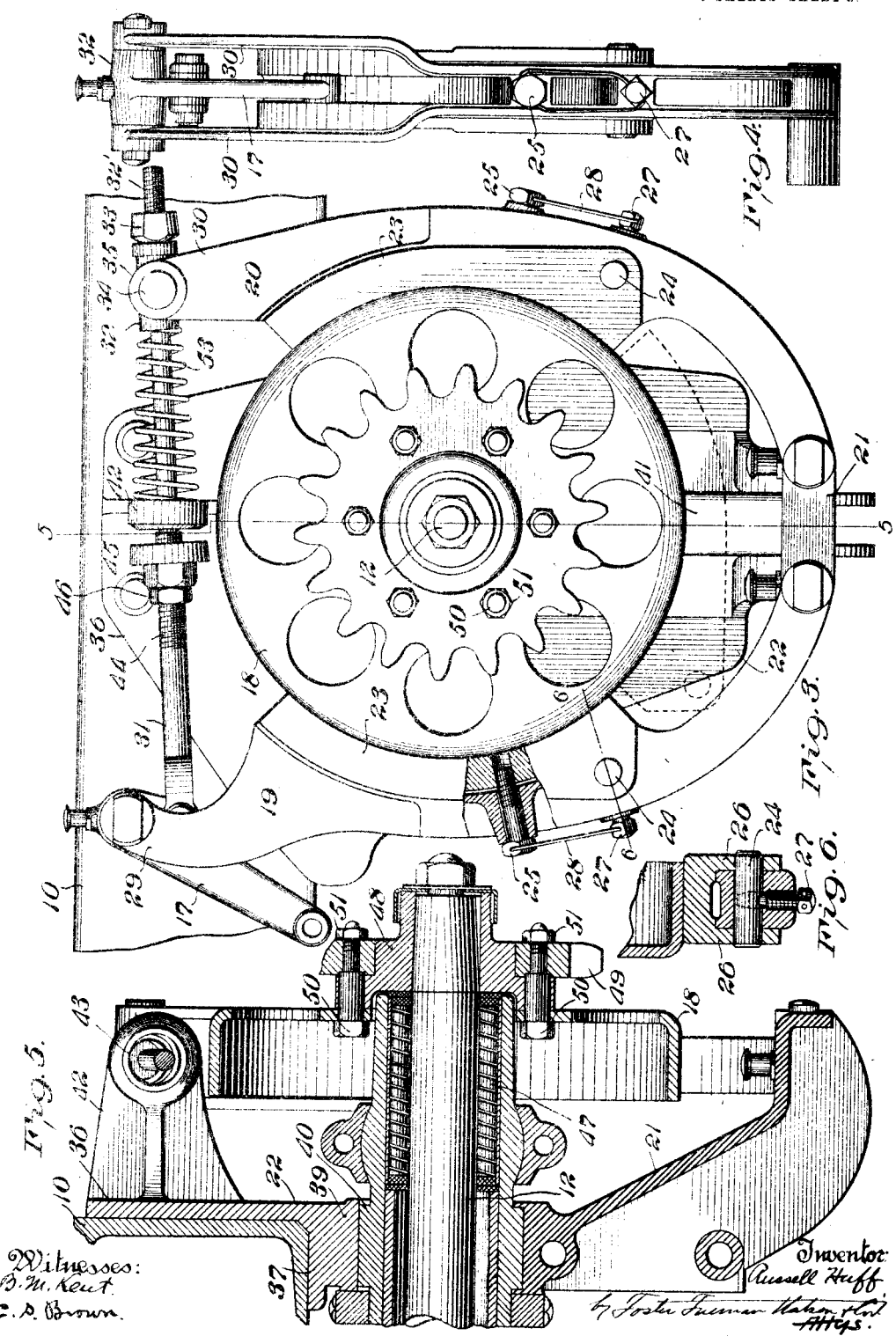

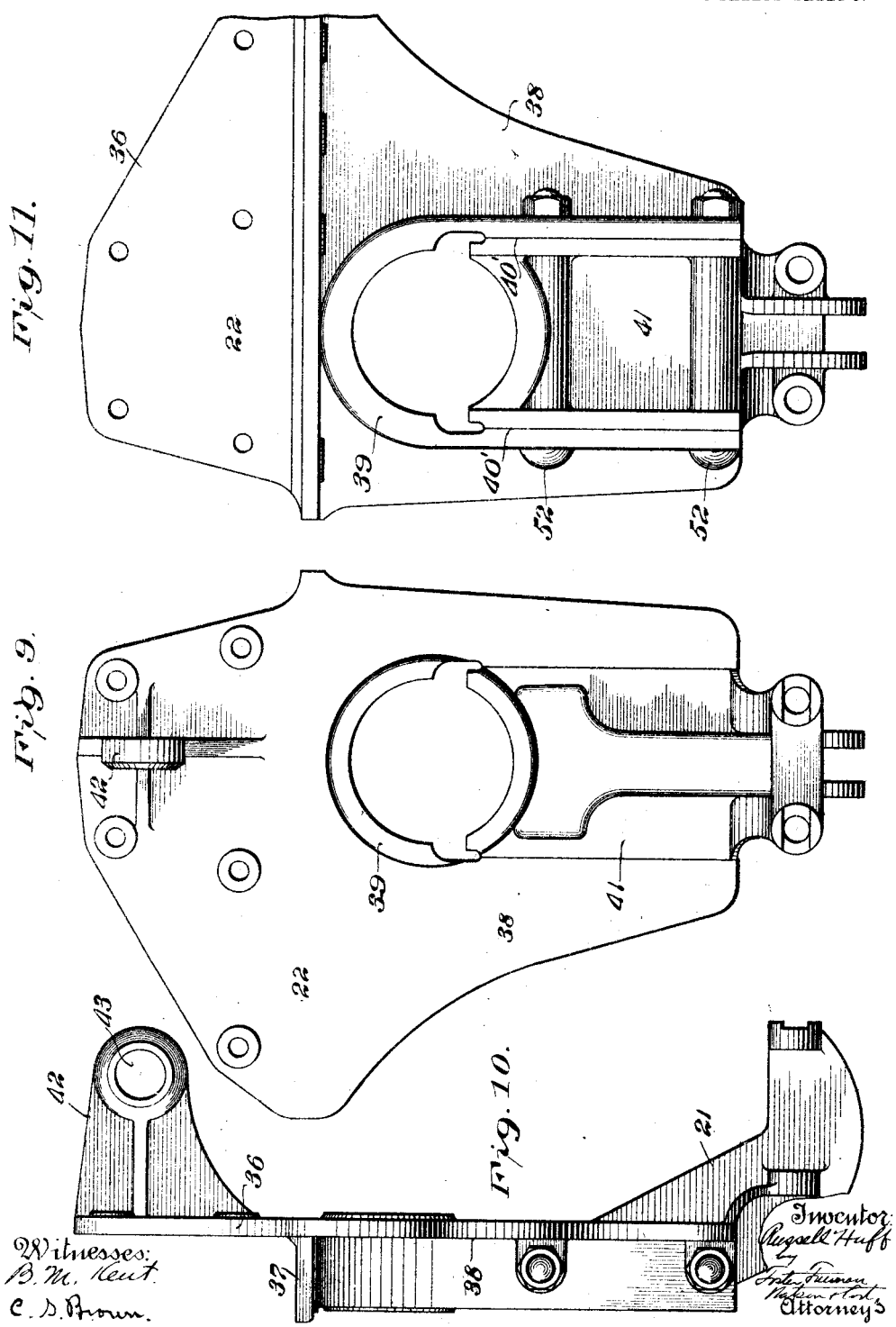

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

BRAKE MECHANISM FOR MOTOR-CARS.

1,120,056.  Specification of Letters Patent.  Patented Dec. 8, 1914.

Application filed July 14, 1911. Serial No. 638,540.

*To all whom it may concern:*

Be it known that I, RUSSELL HUFF, a citizen of the United States, and resident of Detroit, Wayne county, State of Michigan, have invented certain new and useful Improvements in Brake Mechanism for Motor-Cars, of which the following is a specification.

This invention relates to brake mechanism for motor vehicles and has for its object to provide a brake mechanism which is simple in construction, easily assembled and disassembled and the wearing parts of which may be readily replaced.

Other objects and the novel features of the invention will be apparent from the following description taken in connection with the accompanying drawings, in which, Figure 1 is a side elevation of a motor truck embodying my invention; Fig. 2 is a plan view of the brake mechanism shown in Fig. 1; Fig. 3 is a side elevation of the brake mechanism on an enlarged scale; Fig. 4 is an end elevation of Fig. 3; Fig. 5 is a section on the line 5—5, of Fig. 3; Fig. 6 is a section on the line 6—6 of Fig. 3; Figs. 7 and 8 are detail views of the brake shoe; Fig. 9 is an elevation of the outer side of the bracket which supports the jack shaft and brake; Fig. 10 is an elevation of the front end of this bracket, and Fig. 11 is an elevation of the inner side of the same.

Referring to the drawings, the frame of the vehicle is indicated by the numeral 10 and the numeral 11 indicates one of the driving wheels, which are arranged on opposite sides of the vehicle. The wheels 11 are driven from a jack shaft 12, which is formed in two parts and provided with the usual differential gearing, by the chains 13. The vehicle is provided with a steering wheel 14 and operating levers 15. The pedal lever 16 is connected with the brake operating levers 17. On either side of the vehicle and at the ends of the jack shaft are arranged brake mechanisms which comprise a brake drum 18 and brake arms 19 and 20. The arms 19 and 20 are pivoted at their lower ends to an outwardly extending arm 21 carried by a bracket 22, secured to the frame 10. The arms 19 and 20 are provided with brake shoes 23 which are secured to the arms by means of pivots 24 and bolts 25. The faces of the brake shoes 23 are adapted to engage the periphery of the brake drum 18 and these shoes have, at their rear sides, flanges 26 between which are arranged the arms 19 and 20. The lower portions of the flanges 26 are extended rearwardly to a greater extent than the upper portions and form bearings for the pins 24. These pins are rigidly held in the arms 19 and 20 and prevented from rotating by the bolts 27. The bolts 25 pass through openings in the arms 19 and 20 and have screw threaded engagement with the brake shoes from the rear side thereof. Wires 28 are provided for the bolts 25 and 27 on the arms 19 and 20 and are inserted through openings in the heads of the bolts and bent around and prevent the bolts from working loose. The lower portions of the arms 19 and 20 are spaced from the drum 18 a sufficient distance to allow the brake shoes to be withdrawn by being passed downwardly around the drum 18 to the dotted position shown in Fig. 3, in which position the shoes are adapted to be withdrawn by a movement in the direction of the axis of the drum 18.

The upper end of the arm 19 is provided with a pair of upwardly extending members 29 which are pivotally connected with the lever 17. The upper end of the brake arm 20 also has a pair of upwardly extending members 30 which are pivotally connected to one end of the link 31, the other end of this link being pivoted to the lever 17. The pivotal connection between the members 30 and the link 31 comprises a sleeve 32 through which extends the link 31 having a screw-threaded end 32' which engages the nut 33 bearing against the end of the sleeve 32. The sleeve is provided with pivots 34 which engage bearings 35 in the members 30.

The bracket 22 is provided with an upwardly extending portion 36 which is bolted or riveted to the side of the vehicle frame, and a horizontally extending portion 37 which engages the lower side of the frame. The bracket has a downwardly extending portion 38 which is provided with a seat 39 adapted to receive the tubular casing 40 surrounding the shaft 12. An opening 40' extending from the seat 39 to the lower end of the bracket, is provided, and the sides of this opening act as ways for the member 41 which is bolted to the bracket and is provided with the extension 21 to which the brake arms are pivoted.

An outwardly extending lug 42 is provided on the upper part of the bracket and has an eye 43 through which passes the link 31. The link 31 has a screw threaded intermediate portion 44 which engages an adjustable stop 45, a lock nut 46 being provided for the purpose of securing the stop 45 in any desired position. A roller bearing 47 is provided between the shaft 12 and the end of the tubular casing 40, whereby the lateral thrust on the shaft is taken up by the tubular casing and transmitted to the seat 39 of the bracket 22. The top of the member 41 is adapted to engage the lower side of the tubular casing 40 and hold the same firmly against the seat 39. On the end of the shaft 12 is mounted a hub 48 which has bolted thereto the brake drum 18 and the sprocket wheel 49 which receives the driving chain 13. Bolts 50 are arranged in a circle around the outer portion of the hub 48 and engage the brake drum 18 and the sprocket 49 and are adapted to hold these parts in rigid engagement with the hub 48. It will be noticed that by removing the nuts 51 on bolts 50, the sprocket 49 may be readily removed from the hub 48.

In order to remove the brake drum it is only necessary to remove the hub from the shaft and then take out the bolts 50. The jack shaft 12, together with the sprocket and brake drums mounted thereon may be readily removed as a whole by taking out the bolts 52, which secure the member 41 to the bracket 22, and lowering this member on the ways 40. It will be seen that when the member 41 has been removed the jack shaft with its tubular casing may be disengaged from the bracket by being moved downwardly through the opening extending from the seat 39 to the lower edge of the bracket.

The operation of the brake is as follows: By moving the pedal lever 16, the lower end of the lever 17 may be drawn forwardly thereby drawing the link 31 with it and at the same time tending to move the brake arm 19 rearwardly. This action draws the brake arms 19 and 20 against the brake drum 18, thereby setting the brake. When the brake is to be released the lower end of the lever 17 is moved, rearwardly, whereby the stop 45 engages the lug 42 and the connection between the link 31 and the lever 17 then acts as a fixed fulcrum and the upper end of the link 17 is therefore moved forwardly and carries with it the brake arm 19. A spring 53, which is arranged between the lug 42 and the sleeve 32, moves the brake arm 20 away from the brake drum 18.

It will be seen that the brake mechanism above described will be effective in operation and is adapted to be readily dismounted for the purpose of renewing the parts thereof or for the purpose of adjusting the same on account of wear.

Having thus described my invention what I claim as new and desire to secure by Letters-Patent, is,

1. In a motor vehicle, a driving shaft, a brake drum thereon, a bracket secured to the frame of the vehicle and carrying said shaft, an arm secured to said bracket, a pair of brake arms pivotally connected with said bracket arm and arranged to engage said drum, and means for actuating said brake arms.

2. In a motor vehicle, a driving shaft, a brake drum thereon, a bracket secured to the frame of the vehicle and provided with a support for said shaft and having an opening from the support to the side of the bracket, a member secured in said opening and adapted to hold said shaft in said support, brake arms pivotally connected with said member and arranged on opposite sides of said drum, and means for actuating said brake arms.

3. In a motor vehicle, a driving shaft, a brake drum thereon, a bracket secured to the frame of the vehicle and provided with a support for said shaft and having an opening from the support to the side of the bracket and also having a lug projecting into the plane of said drum, a member engaging the sides of said opening and secured therein and adapted to hold said shaft in said support, a pair of brake arms pivotally connected with said member and arranged on opposite sides of said drum, means for bringing said brake arms into engagement with said drum, and means coöperating with said lug for disengaging said arms from said drum.

4. In a motor vehicle, a driving shaft, a hub secured to the driving shaft, and a brake drum and a driving sprocket removably mounted on said hub.

5. In a motor vehicle, a driving shaft, a hub mounted on the end of said shaft and adapted to be readily removed therefrom, a brake drum and a driving sprocket mounted on said hub, and bolts extending through said hub, brake drum and sprocket for securing the same together.

In testimony whereof I affix my signature in presence of two witnesses.

RUSSELL HUFF.

Witnesses:
W. H. FINCKEL, Jr.,
E. A. KIELME.